Jan. 3, 1928.
J. H. WAGENHORST
1,654,565
CUSHION TIRE
Filed Oct. 31, 1921
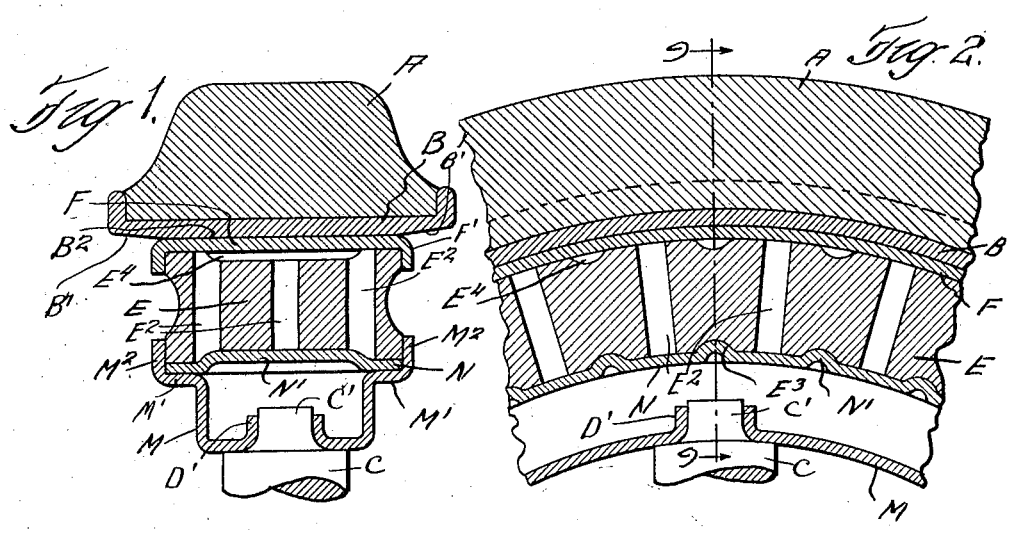

Patented Jan. 3, 1928.

1,654,565

UNITED STATES PATENT OFFICE.

JAMES H. WAGENHORST, OF JACKSON, MICHIGAN.

CUSHION TIRE.

Application filed October 31, 1921. Serial No. 511,858.

This invention relates generally to vehicle tires and more particularly to a novel construction of cushion tire, the object of the invention being to provide a suitable resilient support for a standard type of cushion tire; and a still further object is to provide a novel durable and efficient means for securing the resilient support upon the wheel body and beneath the cushion tire base.

With these objects in view, and certain others which will become apparent as the description proceeds, the invention consists in the novel constructions of the various parts, and in the manner of combining or arranging the same, all of which will be fully described hereinafter and pointed out in the claims.

In the drawings forming a part of this specification Fig. 1 is a transverse sectional view on the line 9—9 of Fig. 2 and showing a cushion tire on a metal base resiliently supported upon the wheel body; and Fig. 2 is a longitudinal sectional view of the same.

In carrying out my invention, I employ a cushion tire A mounted upon an endless base B, the inner face of said base being slightly beveled or tapered at the inner and outer sides thereof as shown at B', leaving the central inner face transversely flat as shown at B². This cushion tire is mounted upon and supported by a wheel body comprising spokes C, preferably of wood and having tenons C' extending into spoke sockets D' formed in the base of the felly M which is of the drop base type and comprises the central inwardly projecting channel, the cylindrical surfaces M' at each side of said channel and the outwardly extending flanges M². A band N fits within the flanges M² resting upon the cylindrical surfaces M' of the felly and this band is provided with transverse corrugations or ridges N'. The resilient support for the cushion tire comprises a ring or band E of rubber of sufficient strength provided with radial passages or recesses E² to reduce its weight and increase its resiliency and having transverse grooves E³ in its inner face and E⁴ in the outer face. The ridges or corrugations N' stiffen the band N and fit into the grooves E³ so as to prevent any circumferential movement of the resilient elements with reference to the felly, and the grooves E⁴ in the outer face of the rubber ring increase its resiliency. On the outer face of the rubber ring E is mounted the transversely split band F having the inwardly projecting flanges F'. The base B carrying the cushion tire is mounted upon this transversely split band F.

It will thus be seen that I provide a simple and durable construction of cushion tire whereby the standard type of cushion tire can be used in connection with a wheel body composed of a sheet metal felly and wooden spokes, the interposed resilient member accommodating itself to load strains both lateral and radial. In assembling the parts the resilient member is first placed upon the sheet metal felly and the recessed portions E³ thereof fitting over the ridges in band N entirely prevent any circumferential movement of the resilient member. The outer band is then placed around the resilient member and the tire base is then forced thereon.

Having thus described my invention, what I claim is:

1. The combination with a channeled fixed rim, of an annular band fitting within said channeled fixed rim and provided with driving corrugations, a cushion member mounted upon said band and having recesses receiving said driving corrugations, a channel member mounted on the periphery of said cushion member, a cushion tire and a metallic base therefor, the latter being seated upon the exterior of said last-mentioned channel member.

2. The combination of a metallic fixed rim of the drop base type having flanges at opposite sides thereof and annular seats at the bases of said flanges and the edges of the dropped base portion, a metallic band seated upon said annular seats and provided with a plurality of driving corrugations, a cushion member seated upon said band and received between the flanges of said fixed rim, said cushion member having recesses receiving said driving corrugations, an outer channel member mounted on the exterior of said cushion member, the flanges of said outer channel member embracing said cushion member, and a cushion tire and a metallic base therefor mounted upon the exterior of said outer channel member.

In testimony whereof, I hereunto affix my signature.

JAMES H. WAGENHORST.